United States Patent Office 2,888,323
Patented May 26, 1959

2,888,323
PRODUCTION OF ACTIVE OXIDES OF LARGE SPECIFIC SURFACE AREA

Stanislas J. Teichner, Villeurbanne, France, assignor to National Research Council, Ottawa, Ontario, Canada, a body corporate of Canada No Drawing. Application December 13, 1955
Serial No. 552,721

7 Claims. (Cl. 23—143)

This invention relates to the production of active oxides of large specific surface area. More particularly, it relates to the process for producing amorphous aluminas of large specific surface area.

The production of active oxides of large specific surface area is a problem which has received considerable attention in the past. These active oxides are very useful intermediates, and are used in the preparation of simple and mixed adsorbents, catalysts and catalytic supports, pigments, bases for lacquers and varnishes, and fillers for paper and some plastics.

Previous methods for the preparation of active oxides have depended upon a two-step reaction. The oxide was precipitated from aqueous solution. This precipitate usually existed in a relatively crystallized state and possessed a small specific surface area. A product of this type was then subjected to further treatment in order to be decomposed into the desired active solid and gaseous by-product.

For example, inactive aluminum hydroxide may be heated slightly to form active alumina:

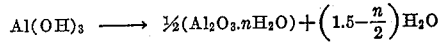

It was found, however, that it was difficult to prepare highly active solids in the pure state by this method. It was found that various anionic or cationic impurities were coprecipitated with the inactive solid. These impurities, in addition to being difficult to remove, were found to result in difficulties being encountered in the calcination of the inactive solid.

In the case of aluminum, the active compound formed is hydrated alumina. In the old method of production, the initial precipitate formed in the aqueous medium is either the monohydrate boehmite, or the trihydrates bayerite and gibbsite, or a mixture of these. When the above-mentioned inactive aluminas are calcined, the product is gamma-alumina. This gamma-alumina is a mixture of different crystalline forms of anhydrous alumina, whose specific surface area rarely exceeds 300 m.²/gm.

It is an object of the present invention to provide a one-step process for the preparation of active oxides.

It is a further object of this invention to prepare an active alumina of a specific surface area which greatly exceed 300 m.²/gm., i.e., a specific surface area of at least 600 m.²/gm.

These and other objects of this invention are achieved by the process for the production of active oxides of large specific surface area which process comprises either (A) dissolving salt of a metal selected from the group consisting of Fe, Cr, Mn, Ni, Co, Ti, V, Mo, Cu, Zn, Mg, and Al in a non-aqueous solvent such as methanol and acetone and precipitating the salt, in the form of a compound selected from the group consisting of oxides and hydroxides from said solvent by a chemical reaction with a base selected from the group consisting of pyridine, aniline, alkali metal hydroxides and anhydrous ammonia, at a temperature below the boiling point of the solvent; or (B) dissolving a base selected from the group consisting of pyridine, aniline, alkali metal hydroxides and anhydrous ammonia in a non-aqueous solvent such as methanol and acetone and precipitating, at a temperature below the boiling point of the solvent, a compound selected from the group consisting of oxides and hydroxides from said solvent by a chemical reaction with the bases dissolved in the solvent with a salt of a metal selected from the group consisting of Fe, Cr, Mn, Ni, Co, Ti, V, Mo, Cu, Zn, Mg, and Al; and, whether procedure (A) or (B) is followed, controlling the amount of water during the chemical reaction between the solvent and the base to an amount between $x$ moles of water per gram ion of cation, where $x$ is the valence of said cation, and 20% by weight of the solvent. In this specification the term "mineral base" also includes ammonium hydroxide.

The most common active oxide prepared by this method is amorphous alumina. In a preferred preparation of amorphous alumina, aluminum chloride hexahydrate, in an anhydrous solvent such as anhydrous methanol, is reacted with anhydrous ammonia gas. The amorphous alumina has a specific surface area of about 600 m.²/gm. The reaction proceeds according to the following equation:

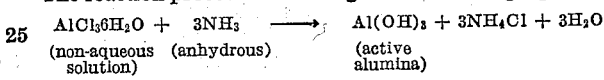

(non-aqueous  (anhydrous)         (active
 solution)                         alumina)

It has been found generally that the amount of water present in the reaction is critical. In the process of the present invention, the amount of water must be kept within certain minimum and certain maximum amounts. In the specific case of alumina, it is necessary to have at least 3 moles (i.e. 54 grams) of water per gram ion of aluminum, since aluminum has a valency of 3, and this minimum quantity with alumina corresponds to about 2% by weight of solvent. In other words, it is necessary to have at least as many moles of water as the valence number of the cation of the salt.

If such minimum amount of water is not present, the reaction does not proceed to form the active oxide. Thus, in the case of anhydrous aluminum chloride in an anhydrous methanol solvent, the reaction would proceed to form the aluminum methylate, according to the following reaction:

$$AlCl_3 + 3CH_3OH + 3NH_3 \rightarrow Al(CH_3O)_3 + 3NH_4Cl$$

The maximum amount of water which may be present in the reaction is somewhat more difficult to specify. Water should not be present in any substantial excess over and above the amount required for the reaction, since the active oxide loses its amorphous structure and its high surface area very rapidly under those conditions. In practice, the amount of water used is preferably as close to the minimum value as possible in order to produce an active oxide of the maximum specific surface area. However, the maximum amount of water which can be tolerated in commercial practice should not exceed 20% by weight of solvent.

As is readily seen, there are a number of feasible methods of introducing the required amount of water into the system. The water may be present in a controlled amount in any or all, of the salt being reacted, the solvent or the base, or it may be added per se. However, the limiting feature is that the water be actually present before the active oxide is separated from the reaction vessel.

It should be noted that the temperature at which the reaction is carried out should be as low as possible for best results. The invention will not normally be useful above the boiling point of the solvent.

It is noted that although amorphous alumina is exemplified as the preferred active oxide, other active oxides may be formed according to the present invention. These oxides are those of the metals of the transition groups, such as iron, chromium, manganese, nickel, cobalt, titanium, vanadium and molybdenum, as well as those of copper, zinc, magnesium and aluminum. More generally, it is possible to use in this invention, salts of metals which, upon reaction with a base, form oxides which are insoluble in the solvent used.

The solvent used in the reaction should be inert. In other words, the solvent should not decompose or combine with the salt starting material, with the base or with the final product. A further desirable feature is that the solvent should dissolve the second salt by-product. This latter characteristic enables the active oxide to be more readily separated from the salt by-product. However, it is not necessary for the solvent to possess this feature, for the product may be purified by using another solvent. The most common solvents used are methanol and acetone, although any other solvent having the above-mentioned characteristics may be used.

The most common base used in precipitating the active oxides according to the present invention is anhydrous ammonia, either in the form of the dry gas or dissolved in a non-aqueous solvent. It is also possible to use mineral bases, such as potassium hydroxide and sodium hydroxide, or organic bases, such as pyridine and aniline.

It should be mentioned however, that if certain mineral bases are used, they must be used in stoichiometric quantities, since the active oxide may combine with the excess mineral base. Furthermore, in the case of organic bases, there is the question of whether the organic base decomposes in the presence of or condenses with the reagents. There is also the further difficulty of purification of the active oxide. Thus, it is evident that the most normal base to be used is ammonia, if the starting salt or the oxide do not give an addition compound with ammonia.

The following examples are given to illustrate the invention:

*Example I*

49 kgm. of $AlCl_3 6H_2O$ are dissolved in 700 litres of methanol and ammonia gas is passed into the solution while maintaining a temperature as close to 0° C. as possible. When slightly more than 13 kgm. of ammonia gas have been absorbed by the reaction mixture, the insoluble precipitate of aluminum hydroxide, which also contains some ammonium chloride is obtained. This precipitate is washed with methanol to free the aluminum hydroxide from the ammonium chloride, which is partially soluble in this solvent. 15.2 kgm. of aluminum hydroxide of composition $Al_2O_3 3.4H_2O$ was obtained. This product was amorphous to X-rays, and had a specific surface area of 600 m.²/gm.

*Examples II–IV*

The same general procedure of Example I was used in the preparation of Examples II, III and IV.

In Example II, 75 kgm. of aluminum nitrate,

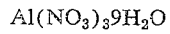
$Al(NO_3)_3 9H_2O$ was dissolved in 700 litres of methanol and reacted with 13 kgm. of ammonia gas. The product was 15 kgm. of aluminum hydroxide of composition $Al_2O_3 3.2H_2O$.

In Example III, 47 kgm. of nickel chloride, $NiCl_2 6H_2O$ was dissolved in 500 litres of methanol and reacted with a solution of 24 kgm. of KOH in 200 litres of methanol. The product was 17.5 kgm. of amorphous nickel hydroxide of composition $NiO 1.08 H_2O$.

In Example IV, 80 kgm. of ferric nitrate,

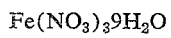
$Fe(NO_3)_3 9H_2O$ was dissolved in 700 litres of acetone and reacted with 13 kgm. of ammonia gas. The product was 20 kgm. of ferric hydroxide of composition $Fe_2O_3 3.3H_2O$. The purification of the active oxide may be done by extracting either with methanol or acetone.

In these examples, the temperature was indicated as being as close to 0° C. as possible.

Any temperature at which the reaction mixture is liquid is satisfactory. In practice, however, the temperature will normally be about 0° C., or at least at a temperature of 10° C. However, it is possible to achieve useful products at any temperature below the boiling point of the solvent.

What I claim is:

1. A process for the production of active oxides of large specific surface area which process comprises: (1) dissolving a salt of a metal selected from the group consisting of Fe, Cr, Mn, Ni, Co, Ti, V, Mo, Cu, Zn, Mg, and Al in a solvent selected from the group consisting of methanol and acetone; (2) precipitating said salt, in the form of a compound selected from the group consisting of oxides and hydroxides, from said solvent by chemical reaction of the salt with a base selected from the group consisting of pyridine, aniline, alkali metal hydroxides and anhydrous ammonia, the reaction taking place at a temperature below the boiling point of said solvent; and (3) controlling the amount of water present in the system during the chemical reaction between the salt and the base to an amount between $x$ moles of water per gram ion of salt cation, where $x$ is a valence of said cation, and 20% by weight of solvent.

2. The process of claim 1 wherein the base is anhydrous ammonia.

3. A process for the production of active oxides of large specific surface area which process comprises: (1) dissolving an hydrated salt of a metal selected from the group consisting of Fe, Cr, Mn, Ni, Co, Ti, V, Mo, Cu, Zn, Mg, and Al in a solvent selected from the group consisting of methanol and acetone; and (2) precipitating said salt, in the form of a compound selected from the group consisting of oxides and hydroxides, from said solvent by chemical reaction with a base selected from the group consisting of pyridine, aniline, alkali metal hydroxides and anhydrous ammonia, the reaction taking place at a temperature below the boiling point of said solvent, and wherein the hydrated salt contains an amount of water of at least $x$ moles of water per gram ion of salt cation, where $x$ is the valence of said cation.

4. A process for the production of active oxides of large specific surface area which process comprises: (1) dissolving an hydrated salt of a metal selected from the group consisting of Fe, Cr, Mn, Ni, Co, Ti, V, Mo, Cu, Zn, Mg, and Al in a solvent selected from the group consisting of methanol and acetone; and (2) precipitating said salt, in the form of a compound selected from the group consisting of oxides and hydroxides by chemical reaction of said salt at a temperature below 10° C., with a base selected from the group consisting of pyridine, aniline, alkali metal hydroxides and anhydrous ammonia; the hydrated salt containing an amount of water of at least $x$ moles of water per gram ion of salt cation, where $x$ is a valence of said cation.

5. A process for the production of active oxides of large specific surface area which process comprises: (1) dissolving an hydrated salt of a metal selected from the group consisting of Fe, Cr, Mn, Ni, Co, Ti, V, Mo, Cu, Zn, Mg, and Al in a non-aqueous solvent selected from the group consisting of methanol and acetone; (2) precipitating said salt, in the form of a compound selected from the group consisting of oxides and hydroxides, from said solvent by chemical reaction with ammonia at a temperature below 10° C.; and (3) controlling the amount of water in the system during the chemical reaction between the salt and the ammonia to an amount of between about $x$ moles of water per gram ion of salt ion, where $x$ is the valence of cation, and about 20% by weight of solvent.

6. A process for the production of active alumina which process comprises: (1) dissolving aluminum chloride hexahydrate in anhydrous methanol; and (2) precipitating said active alumina from said solvent by chemical reaction of the aluminum chloride with anhydrous ammonia at a temperature of about 0° C.

7. A process for the production of active oxides of large specific surface area which process comprises: (1) dissolving a base selected from the group consisting of pyridine, aniline, alkali metal hydroxides and anhydrous ammonia in a solvent selected from the group consisting of methanol and acetone; (2) precipitating in said solvent a compound selected from the group consisting of oxides and hydroxides, by reaction of said base with a salt of a metal selected from the group consisting of Fe, Cr, Mn, Ni, Co, Ti, V, Mo, Cu, Zn, Mg, and Al at a temperature below the boiling point of said solvent; and (3) controlling the amount of water during the chemical reaction to an amount between about $x$ moles of water per gram ion of salt cation, where $x$ is a valence of said cation, and 20% by weight of solvent.

References Cited in the file of this patent

UNITED STATES PATENTS

| | | |
|---|---|---|
| 2,406,420 | Weiser | Aug. 27, 1946 |
| 2,455,445 | See et al. | Dec. 7, 1948 |
| 2,737,444 | Fisher et al. | Mar. 6, 1956 |